United States Patent [19]

Dixon et al.

[11] Patent Number: 4,902,470

[45] Date of Patent: Feb. 20, 1990

[54] CONTROL ROD

[75] Inventors: Robert C. Dixon, Morgan Hill; James E. Cearley, San Jose; Paul Van Diemen, San Jose; Edwin D. Sayre, Los Gatos; Gerald M. Gordon, Soquel, all of Calif.

[73] Assignee: General Electric Company, San Jose, Calif.

[21] Appl. No.: 31,633

[22] Filed: Mar. 30, 1987

[51] Int. Cl.$^4$ .............................................. G21C 7/10
[52] U.S. Cl. .................................... 376/333; 376/327; 376/463
[58] Field of Search ............... 376/327, 333, 454, 455, 376/463; 165/168-172; 122/6 A; 228/183

[56] References Cited

U.S. PATENT DOCUMENTS

| | | | |
|---|---|---|---|
| 2,025,266 | 12/1935 | Bros | 122/6 A |
| 2,861,035 | 11/1958 | Zinn et al. | 376/327 |
| 2,910,417 | 10/1959 | Teitel | 376/327 |
| 2,917,444 | 12/1959 | Dreffin | 376/327 |
| 2,998,640 | 9/1961 | Huet | 228/183 |
| 3,197,376 | 7/1965 | Balent et al. | 376/327 |
| 3,407,117 | 10/1968 | Lichtenberger | 376/327 |
| 3,485,717 | 12/1969 | Eich | 376/333 |
| 3,712,852 | 1/1973 | Fisher | 376/327 |
| 4,400,347 | 8/1983 | Fredin et al. | 376/327 |
| 4,581,201 | 4/1986 | Haggstrom et al. | 376/327 |
| 4,676,948 | 6/1987 | Cearley et al. | 376/333 |
| 4,678,629 | 7/1987 | Popa | 376/455 |

FOREIGN PATENT DOCUMENTS

| | | | |
|---|---|---|---|
| 3431343 | 3/1986 | Fed. Rep. of Germany | 122/6 A |
| 0071988 | 4/1985 | Japan | 376/307 |
| 376974 | 7/1932 | United Kingdom | 165/169 |

OTHER PUBLICATIONS

FIGS. 2-6a. Control Rod Assembly 2-73/2-74/1 p.
Applications of Hafnium/ASEA-ATOM/2 pp.

*Primary Examiner*—Harvey E. Behrend
*Attorney, Agent, or Firm*—Robert R. Schroeder

[57] ABSTRACT

An apparatus and process for control rod assembly and construction for a nuclear reactor is disclosed wherein the control rod is of cruciform configuration having a plurality of and preferably four flat planar members. Each planar member is made up with an assembly of square cross sectioned tubular members. Each square cross sectioned tubular member includes a defined cylindrical center and a constant thickness surrounding tubular metallic shell to provide the contained neutron absorbing materials in a cylindrically shaped pressure vessel. The constant thickness surrounding tubular shell constituting the cylindrical shaped pressure vessel has four corner sections added to generate a modified square exterior profile. These added four corner sections comprise an addition to the tubular side wall thickness of the shell. Appropriate chamfers and rounding are provided to the square profile to impart both stress relief and convenient points for automated welding between side-by-side square sections. The square cross sectioned tubular members when welded together extend axially and longitudinally the length of the control rod in the direction of control rod movement and fluid flow. The square cross sectioned tubular members are filled with a neutron absorbing material, plugged at both ends, and fastened by welding in side-by-side relation to form the planar control rod members of the required cruciform shape. These square cross sectioned tubular members as welded in side-by-side relation are an integral portion of the longitudinal support structure of the control rod and fasten and interconnect the handle at the top of the control rod and a conventional velocity limiting device at the bottom of the control rod. The fastening of the handles and velocity limiting device at the respective top and bottom provides a secondary and supplemental seal to primary plugs containing the neutron absorbing material. If needed for enhanced life, provision is made for the incorporation of a hafnium plate in a rectangular sectioned tube adjacent the handle at upper end of the control rod, this tip being variable in length dependent upon individual control rod requirements. Thus square sectioned tubular members form an improved poison containing cylindrical volume for providing resultant improved control rod worth and increased in service life time in moderating and shutting down nuclear reactions. Consequently, the disclosed construction can be used both for conventional control rods as well as for control rod configured for control cell locations.

21 Claims, 4 Drawing Sheets

CONTROL ROD

BACKGROUND OF THE INVENTION

This invention relates to nuclear reactor control rods used in Boiling Water Reactors (BWR's). More specifically, a control rod construction is disclosed in which square sectioned tubular members are compositely welded together in the required cruciform configuration to provide a new type of control rod having high neutron absorbing worth and long in service life time.

SUMMARY OF THE PRIOR ART

Nuclear reactors have control rods containing poisons for neutron absorption and either shutting down or shaping their nuclear reactions. The control rods typically used in BWR type reactors are provided with a cruciform shape and pass in the complementary cruciform shaped interstices between fuel channels. The control rods of the prior art are of two principal configurations.

In one configuration, control rods have included sealed, hollow tubes placed in side-by-side relation along the axis of the cruciform shaped control rods. The tubes have extended vertically, are plugged at both ends and contained a neutron absorbing material such as boron carbide on the inside. The rods themselves are in turn contained within a metallic sheath. This sheath completely surrounds the rods on the outside. The metallic sheath in cooperation with top and bottom support structures are fastened through a central tie rod to confine the rods in side-by-side relation. Typically both the top and bottom support structures and sheath impart to the side-by-side rods the required cruciform shape.

It is important to note in this prior art construction that the tubes containing and confining the neutron absorbing material do not contribute to the structural integrity of the control rod. Rather, separate and relatively heavy structural members including the central tie rod are required to hold the assembled control rod together.

In another prior art configuration, it has been known to provide a solid stainless steel member with drilled holes. This solid steel member has the length and width of the prior art sheath. This solid steel member has a plurality of accurately drilled holes extending horizontally from the side edges of the rod to and towards the center of the required cruciform shape. These holes are horizontally drilled with gun drills to define accurately aligned cylindrical volumes for the containment of neutron absorbing materials. Such control rods with horizontal holes can contain slightly higher volumes of neutron absorbing materials than the control rods containing tubes and sheaths.

All control rod designs have attempted to maximize neutron absorbing material volume, provide the required structural rigidity to the control rod, and to have a weight limit sufficient to permit required rapid movement by conventional control rod movement drives. Further, all control rods must provide containment for their nuclear poisons such as boron carbide hafnium and other neutron absorbers to prevent loss of poison and contamination of the reactor. This containment must withstand external system pressure at the beginning of in service life and generated internal pressures from atomic decomposition at the end of in service life.

Regarding generated internal pressures from atomic decomposition, many of the nuclear reactor poisons undergo element change. For example, boron carbide when absorbing neutrons eventually generates helium. The helium accumulates at high pressures. Simultaneously, the boron carbide swells and sinters. The combination of the gas production and the sintering traps gasses in localized pockets under extremely high pressure.

Control rods utilized within a modern nuclear reactor are of two general types. First, control rods having the purpose of shutting down the reactor are typically designed to have relatively high neutron absorbing worth. These control rods are not designed to withstand high neutron fluence for long periods of time.

Secondly, control rods for control cell locations are designed for the purposed of controlling and shaping the neutron flux profile of the reactor. These latter control rods must have long in service life times with high neutron fluence.

Control rod design must include provision for both types of control rods.

SUMMARY OF THE INVENTION

An apparatus and process for control rod assembly and construction for a nuclear reactor is disclosed wherein the control rod is of cruciform configuration having a plurality of and preferably four flat planar members. Each planar member is made up with an assembly of square cross sectioned tubular members. Each square cross sectioned tubular member includes a defined cylindrical center and a constant thickness surrounding tubular metallic shell to provide the contained neutron absorbing materials in a cylindrically shaped pressure vessel. The constant thickness surrounding tubular shell constituting the cylindrical shaped pressure vessel has four corner sections added to generate a modified square exterior profile. These added four corner sections comprise an addition to the tubular side wall thickness of the shell. Appropriate chamfers and rounding are provided to the square profile to impart both stress relief and convenient points for automated welding between side-by-side square sections. The square cross sectioned tubular members when welded together extend axially and longitudinally the length of the control rod in the direction of control rod movement and fluid flow. The square cross sectioned tubular members are filled with a neutron absorbing material, plugged at both ends, and fastened by welding in side-by-side relation to form the planar control rod members of the required cruciform shape. These square cross sectioned tubular members as welded in side-by-side relation are an integral portion of the longitudinal support structure of the control rod and fasten and interconnect the handle at the top of the control rod and a conventional velocity limiting device at the bottom of the control rod. The fastening of the handles and velocity limiting device at the respective top and bottom provides a secondary and supplemental seal to primary plugs containing the neutron absorbing material. If needed for enhanced life, provision is made for the incorporation of a hafnium plate in a rectangular sectioned tube adjacent the handle at upper end of the control rod, this tip being variable in length dependent upon individual control rod requirements. Thus square sectioned tubular members form an improved poison containing cylindrical volume for providing resultant improved control rod worth and increased in service life time in moderating and shutting down nuclear reactions. Consequently, the disclosed construction can be used both for conventional control rods as well as for control rod configured for control cell locations.

Other Objects and Advantages

An object of this invention is to disclose a a square cross sectioned tubular member for the composite construction of cruciform shaped control rods. The tubular member has a cylindrical inside. Surrounding the cylindrical inside is a constant sectioned tubular cylinder. The constant sectioned tubular cylinder is provided with a modified square exterior profile. Specifically, and on each corner, the tubular section increases. It increases to define four corners to impart the square cross section. This square cross section exceeds slightly the diameter of the tube. Appropriate chamfers and rounding of the junction between the square corners and tubular sides is provided for stress relief.

An advantage of this aspect of the invention is the resultant square cross sectioned tubular member is a good pressure vessel. It can accommodate all foreseeable pressures due to neutron absorbing material decomposition and sintering.

A further advantage is that the disclosed square cross sectioned tubular member has a relatively high volume of poison containment per unit weight when compared to control rods of the prior art. Consequently, larger volumes of neutron absorbing materials can be maintained in each tubular section. A control rod construction with an over 10% increase in overall worth can result. The inherent light weight of the square cross sectioned tubular members allows the use of increased hafnium absorber material and consequently enables the construction of increased life control rods.

Another advantage of the disclosed square cross sectioned tubular member is that the number and internal composition of poison containing tubular volumes can be varied. This variation can be tailored to the location and purpose for which the control rod is to be used. For example, for control rods placed in control cells, relatively large amounts of hafnium can be used for an extended in service life time. Conversely, for control rods utilized only to shut down a reactor, increased quantities of boron carbide can be placed within the control rod to give high control rod worth.

A further advantage of the disclosed tubular member is that it has a high strength to weight ratio. Consequently, control rods assembled from a plurality of such side-by-side tubular members can withstand all foreseeable static and dynamic loadings.

A further advantage is that the tubular member can be manufactured by standard tube making techniques. Consequently, tubes surrounded by a sheath are not required. Moreover, gun drilling to high degrees of accuracy is not required. Accurately aligned vertically extending cylindrical volumes are defined by the square cross section tubular members.

Yet another advantage of the disclosed control rod construction is that each tube forms its own separate and isolated chamber for containing and isolating the neutron absorbing material. Consequently, any leakage of one tube from cracking, wear or construction defect is isolated to the discrete tube having the defect. Adjacent tubes are not necessarily affected.

A further object of this invention is to disclose a composite control rod. According to this aspect of the invention the tubular members are laid side-by-side and juxtaposed. When juxtaposed, their chamfered and rounded corners define natural grooves for the introduction of welding material. The rods, when welded in their side-by-side relation, form the flat planar members of the cruciform shaped control rods.

An advantage of the composite control rod is that it can be fabricated utilizing automated welding techniques. The disclosed design is particularly suitable for automated laser welding. Consequently a high degree of fabrication flexibility is present in the disclosed design.

Further, and due to the built up corners of the rod, the placed welding metal in no way interferes with the structural integrity of the constant sectioned tubular containment.

A further advantage of this invention is that the composite tubular construction has an improved wear resistant profile. Specifically, the corner sections are built up slightly beyond the tubular section. Where control rod chafing occurs to adjacent fuel channels, the excess corner sections contact the channels. Wearing away of the required constant sectioned tubular containment is avoided.

Yet another advantage of the control rod construction is that their side-by-side make up of the square sectioned tubes extends axially in the direction of the control rod movement. Consequently, any defined grooves in the control rod are continuous and with continuity in the direction of control rod movement and fluid flow. Thus, the chances of mechanical interference between channels with required control rod movement is minimized.

A further object of this invention is to disclose a composite control rod fabricated from the square sectioned tubes herein disclose. According to this aspect of the invention, the square sectioned tubes are welded in side-by-side relation so that the joined tubes form the planar neutron absorbing members of the control rods. Thereafter, the neutron absorbing material is placed within the side-by-side cylindrical volumes and both ends of the tubes are plugged with primary plug seals so as to trap the neutron absorbing material within each cylinder. Once the primary plug seals are in place, the plugged ends of the tubes are machined and joined to the handle at the upper end and the velocity limiter at the lower end to form a complete control rod construction. This joining to the handle and the velocity limiter constitutes a secondary and supplemental seal to the contained neutron absorbing material.

A primary advantage of the disclosed design is that the number of poison containing chambers for containing the neutron absorbing material can be varied. For example, in locations exposed to relatively low neutron fluence, centrally located cylinders can be omitted. Conversely, in sections of the reactor having relatively high neutron fluence, a relatively full profile of cylinders filled with neutron absorbing material extending the full width of the control rod can be used.

An advantage of this aspect of the invention is that the square tube construction forms longitudinally extending structural members for the control rod. These longitudinally extending structural members obviate the necessity of having vertically extending tie rods for holding the control rod together. Consequently, the weight is reduced and construction simplified.

Yet another advantage of the disclosed control rod construction is that the connection of the control rod planar members only need be occasional to provide the necessary columnar stiffness to the entire control rod.

Opposite sides of the control rods only need be fastened intermittently to provide the requisite stiffness to withstand anticipated buckling forces during insertion. For example, seismic events are postulated and simultaneous control rod insertion for scraming of the plant during the anticipated seismic event is utilized as a worst case design criteria. The intermittent connection between the planar control rod members can be designed to impart to the control rods sufficient flexibility to fit between dynamically bowed fuel cells while retaining sufficient columnar rigidity to ensure insertion.

A further advantage of the disclosed control rod construction is that a greater volume of neutron absorbing material can be maintained within the control rod per unit weight of the disclosed control rod construction. Consequently, control rods having a weight that can be manipulated by existing control rod drives are disclosed which have superior worth. An improved cold shut down margin can result.

An additional advantage of the achieved high control rod worth of this invention is that the placement of gadolinium within the reactor fuel load can be reduced. Specifically, the improved worth of the control rod enables greater enrichment of the fuel load because the higher worth control rod has greater capability in reaction control.

Yet another advantage of the disclosed construction is that the joining of the upper and lower plugged ends of the control rod to the handle and velocity limiter provides a secondary seal supplementing the seal provided by the plugs at the end of the cylinders.

A further object is to disclose a control rod having a plate of neutron absorbing material (preferably hafnium) captured near the upper end thereof. According to this aspect of the invention, a rectangular sectioned tube is fastened to the end of the square tube array. This rectangular sectioned tube has a plate of neutron absorbing material, preferably hafnium, placed within it. Thereafter, the control rod handle is placed and fastened to the rectangular tube to seal the plate at the tip of the control rod. Likewise the bottom of the rectangular tube is fastened to the flat planar member of the control rod. Both connections effect the preferred secondary seal to the contained neutron absorbing material within the cylindrical volumes of the control rod.

An advantage of the rectangular tube enclosing the neutron absorbing material is that the tube forms the required structural member connecting the handle to the remainder of the control rod.

Another advantage of the disclosed construction is that virtually all types of control rods can be fabricated using the disclosed control rod design. Specifically, rods of high worth for shutting down or scraming a reactor can be fabricated utilizing a boron carbide absorber with hafnium tips. Similarly, and by installing increased amounts of hafnium at the side edge and ends of the disclosed high strength to weight ratio of rod construction a control rod tolerant to high levels of neutron fluence experienced at control cells is disclosed.

BRIEF DESCRIPTION OF THE DRAWINGS

Other objects features, and advantages of this invention will be more apparent after referring to the specification and attached drawings in which:

FIG. 1 is a horizontal section taken from a control rod illustrating several square cross sectioned tubular members of this invention in side-by-side alignment:

FIG. 2A is a reduced section similar to FIG. 1 illustrating the partial composite construction of a cruciform shaped rod according to this invention and having a planar control rod member containing 15 side-by-side square sectioned tubes; and.

FIG. 8 is a detail of the tip of a control rod constructed in accordance with this invention illustrating the encapsulation of a hafnium tip in the rod to provide a control rod having long in service life: and.

Figures 1, 2A:
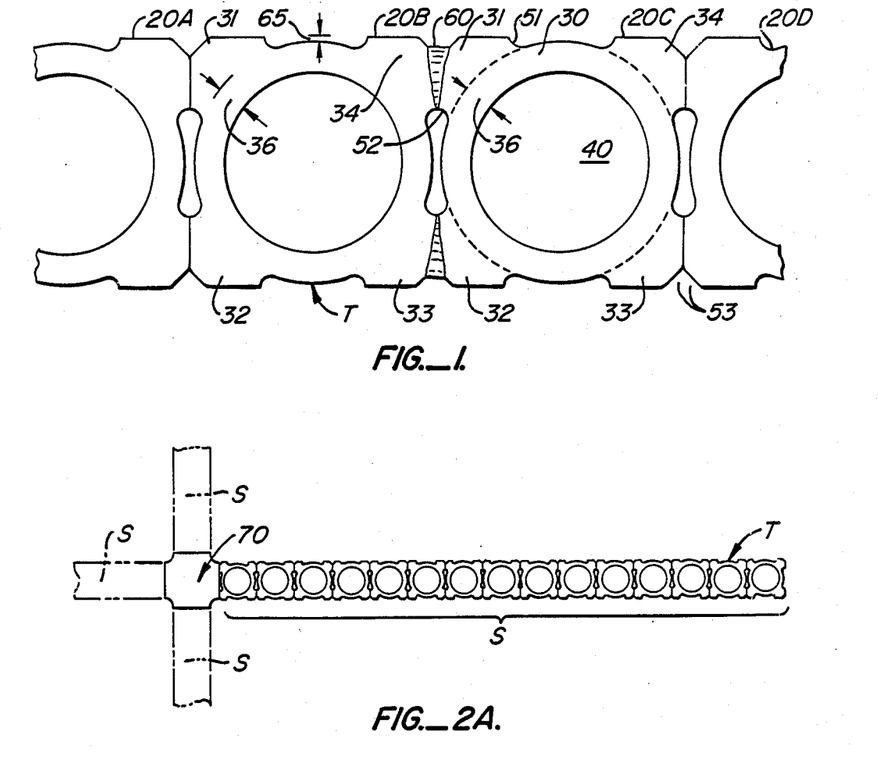

Referring to FIG. 1, an actual section of the composite control rod is illustrated. Applicants point out that while size is not normally construed to be indicative of invention the construction of nuclear reactors renders size in this invention important.

The control rod herein can be fabricated to discrete sizes. By way of example, a square sectioned rod having 0.260 inch cross sectional dimension includes 0.190 inch inside diameter cylindrical volume. Alternately, a square sectioned rod having a 0.312 inch cross sectional dimension includes 0.240 inch inside diameter. Wall thickness of 0.030 inch is provided for both sizes. It will be seen with the aforementioned dimensions that the square section of the rod slightly exceeds the tube diameter. Other dimensions may as well be used.

Figure 3:
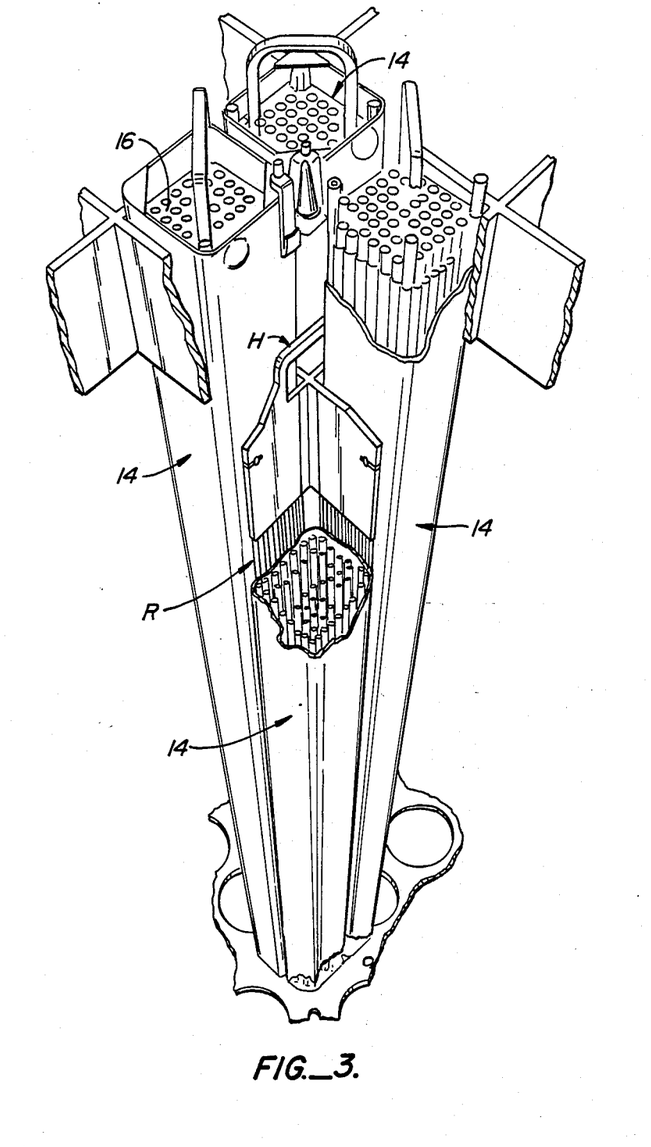
FIG. 3 is a perspective view illustrating a control rod coming up from under four side-by-side fuel channels for absorbing neutrons in the control of a nuclear reaction.

A word about BWR nuclear reactors with quick reference to FIG. 3 is worthwhile. Specifically, the nuclear reactors have fuel channels 14 containing tubes 16. Interior of the tubes 16 are placed the nuclear fuel pellets which generates the chain nuclear reaction. BWR type reactors introduce the control rods from the bottom towards the top. Such a control rod R is shown in FIG. 3 coming up between the respective fuel channels 14.

Some further dimensions can be instructive. Typically, the control rods are 174 inches long. The length of fuel loading in a nuclear reactor can be in the range of 144 to 150 inches. Typically, the interstitial space between adjacent fuel channels is in the order of a half inch.

Mechanisms for moving the control rods are conventional and expensive to replace. Consequently, it is important that new control rods be of such size and such weight that no substantial alteration is required to the control rod drives, fuel, and core support hardware.

Typically, control rod drives precisely move the control rods R to positions of partial insertion for shaping the reactor "burn." Additionally, and for purposes of SCRAM. the control rods must move rapidly from any current position to full insertion within the reactor. In some types of reactors, the entire 12 foot length of the control rod must be capable of insertion into the interstices between fuel channels 14 in the range of 1.6 seconds. Consequently, acceleration and deceleration forces are to be reckoned with in the construction of the control rod. Moreover, the control rods must have sufficient rigidity to withstand anticipated seismic loadings.

Regarding seismic events, two conditions must be simultaneously considered in a design "worse case" scenario. First, and since the most significant component of seismic loading on a reactor is horizontal and dynamic, it can be anticipated that during a seismic event the individual fuel channels will have a bowed configuration. Secondly, and because of the seismic event, scraming of the reactor will be desired. Consequently, the control rods will have to be sufficiently flexible to penetrate the interstices of the fuel channels while having sufficient columnar strength to avoid buckling.

Having introduced the environment to which the invention resides, the rod construction itself may be rather simply understood.

Referring to FIG. 1, square sectioned tubular member 20A, 20B, 20C, and 20D are shown in side-by-side configuration. Taking the case of configuration 20C. the elemental construction of the square sectioned tubular member can be easily seen and understood.

Typically, each section includes a constant sectioned cylinder 30. Further, each tubular section includes four added corners. The added corners are corners 31, 32, 33, and 34.

A broken line has been drawn between each of the respective corner sections 31, 32, 33 and 34 and the constant sectioned cylinder 30. This broken line demonstrates that cylinder 30 has a constant side wall of thickness 36 that extends entirely around the defined cylindrical volume 40 of the control rod. This constant side wall thickness 36 provides the requisite containment and pressure resistant vessel required by the control rod construction.

Corner sections 31, 32, 33 and 34 serve at least two additional purposes.

First, the corner sections impart to the disclosed tube the required square cross section. The tubes can thus be welded in side-by-side relation.

Secondly, the corner sections constitute wear points. Where contact occurs between the fuel channels and the sides of the control rods, the respective corner sections 31, 32, 33, and 34 will effect such contact first. The tubular member will not at all be affected or worn.

Further, and as will be hereinafter discussed, the thickness of the corner sections prevents the weld from interfering with the structural integrity of the tube.

It is known that in metallic pressure vessels that sharp surfaces are to be avoided. Accordingly, each of the corner sections is provided with fillets 51, 52. These respective fillets define a transition between the respective corner sections and the tubular sides. Likewise, the corners are chamfered and rounded at area 53. Thus, the corners are not sharp and are specified to conform to tube fabrication technology, including for example drawing.

Referring to FIG. 1 and specifically at the corner 60 between rod 20B and 20C, the placement of welding metal is illustrated. It can be seen that the adjacent chamfered and rounded corners 53 between control rods 20B and 20C have defined a convenient interstitial area for the introduction of weld metal. The weld metal has penetrated in the shaded wedge shaped area illustrated at 60.

Regarding this shaded wedge shaped weld metal area, it will be seen that it penetrates the corner section only. It does not penetrate or interfere with the required tubular side wall 36 required around the cylindrical volume 40.

Further, it will be understood that there is produced a generally "V"-shaped groove between the respective tubular members 20B. 20C. This V-shaped grove is ideal for tracking by automated welding equipment. Thus the composite rod here set forth can be directly fabricated from automated welding techniques, preferably laser welding.

Having set forth construction and cooperation of the individual control rod sections, a composite control rod constructed in accordance with this invention a cruciform shape can be understood. Specifically, and referring to FIG. 2A. 15 tubes T are shown welded in side-by-side relationship. The tubes T extend from a central intermittent and cruciformed solid member 70. The square cross sectioned tubular members together produce a planar side S of a control rod. As is apparent, four sides S can be attached to central intermittent member 70 to impart to the rod the required cruciform cross section.

Figure 2B:
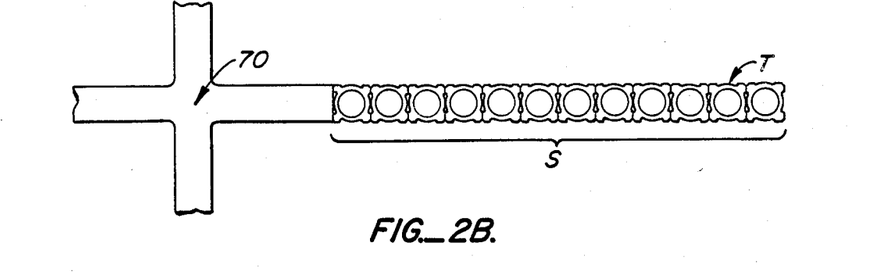
FIG. 2B is a section similar to FIG. 2A illustrating a control rod section incorporating 12 side-by-side square sectioned tubes.

The disclosed design includes flexibility in the number and location of individual cylindrical volumes used to contain neutron absorbing material. Referring to FIG. 2B. a control rod including only 12 side-by-side tube T is illustrated for placement in a reactor at a location having lesser neutron fluence. As is apparent, the number of tubes utilized in the control rod can vary as individual control rod parameters likewise vary.

Referring to FIG. 3, the completed rod is illustrated at R. It is shown in the interstices between four adjacent fuel channels 14. The completely assembled control rod is shown in a position to control nuclear reaction, the position here illustrated being close to full insertion.

Having illustrated the rod in its controlling environment in FIG. 3 attention can now be directed to the details of fabrication of the control rod. First the overall control rod configuration will be set forth with respect to FIG. 4. Thereafter, the various control rod sections will be discussed with respect to FIGS. 5. 6 and 7. Plugging of the ends of the control rod will be discussed with respect to FIG. 9. Finally, the addition of hafnium tips to the end of the control rod will be set forth with respect to FIG. 8.

Figure 4:
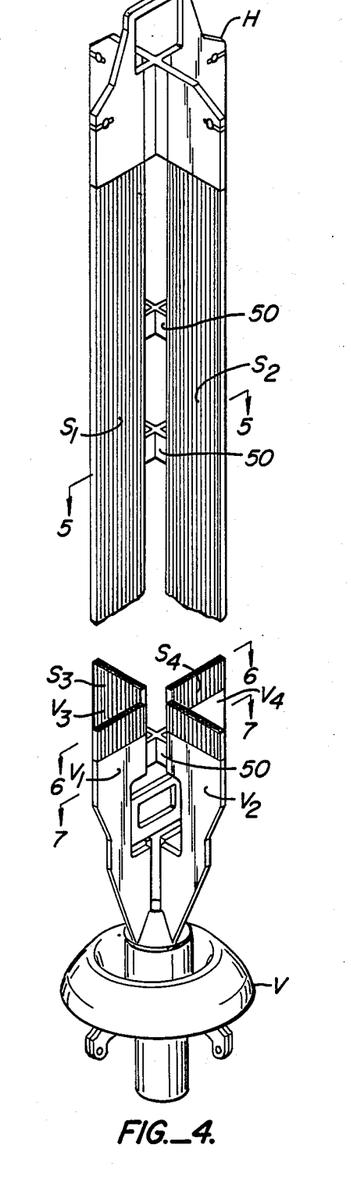
FIG. 4 is a perspective view, partially broken away illustrating the control rod of FIG. 3 clear of the fuel channels of FIG. 3.

Referring to FIG. 4, a completed control rod is illustrated. The control rod includes a velocity limiter V at the bottom, a handle H at the top and four respective planar sides S1, S2, S3 and S4 therebetween.

Unlike the prior art, the disclosed control rod includes cruciformed shaped tie segments 50 placed at respective intervals to brace the respective planar sides S1–S4 one with respect to another. Segments 50 are not continuous the longitudinal length of the disclosed control rod. Instead they are intermittent.

The limiting factor in the number of such segments is a combination of both flexibility and imparted columnar strength to the control rod during anticipated seismic events. Spacers 50 are provided at intervals so that the control rod may be flexible to enter the interstices between dynamically bowed fuel cells during seismic events. At the same time, the spacers 50 are placed to ensure to the control rod the desired degree of columnar strength to prevent columnar buckling during seismic event insertion.

This design gives the rod three respective profiles.

Figure 5:
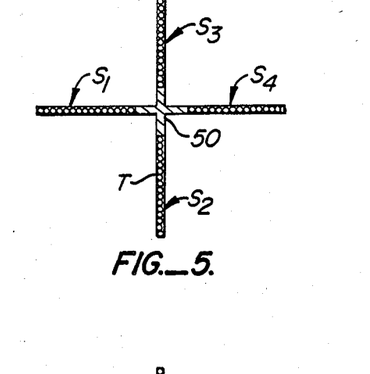
FIGS. 5, 6, and 7, are respective sections of the control rod of FIG. 4.

Referring to FIG. 5, the profile of the rod at a cruciformed shaped segment 50 is illustrated. Specifically, planar sides S1–S4 are all joined to the cruciformed shaped segment 50.

Figure 6:
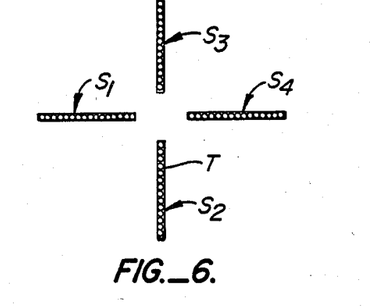

Referring to FIG. 6, the cross section of the control rod is illustrated at an interstitial location between segments 50. At this location, it is seen that the respective planar surfaces S1–S4 are not joined. Thus, the prior art continuous tie rod is completely omitted.

It has been emphasized that the tube segments T participate as structural members of the disclosed control rod configuration. This participation enables elimination of a continuous tie rod and allows intermittent segments 50.

It should be understood that the cruciform segments 50 here illustrated are not absolutely required. For example, intermittent plates can be used as well. Such plates would preferably alternately brace opposite surfaces S1 and S4 and thereafter surfaces S2 and S3.

Figure 7:
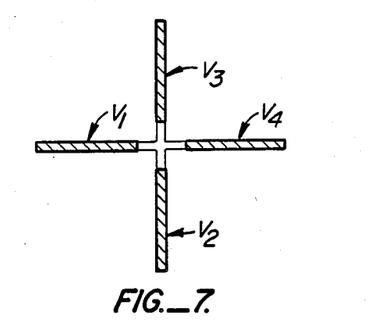

Referring to FIG. 4 at section 7—7 and FIG. 7 it can be seen that the velocity limiter end of the rod has a cruciform configuration similar to both the handle and the planar rod members S1–S4. Referring to FIG. 7, respective planar sections V1–V4 are illustrated.

Figure 9:
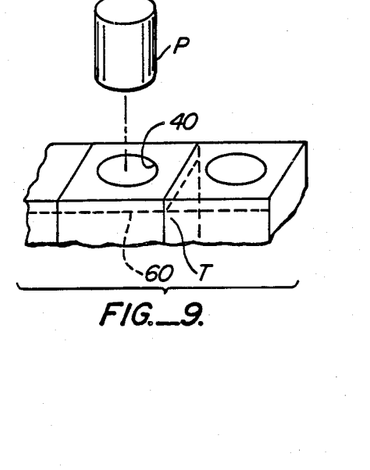
FIG. 9 is a detail of plugs at one end of a the square sectioned tube illustrating plugging of the tube for the containment of the neutron absorbing materials within the cylindrical volume of the tube.

Referring to FIG. 9, a typical tube T is illustrated. Tube T is shown with a plug P inserted within cylindrical volume 40 of the tube. Plug P is placed at both ends of the tube so as to confine neutron absorbing materials interior of the rods.

It will be appreciated that the neutron absorbing material placed within cylindrical volume 40 is typically confined to boron carbide ($B_4C$) It will be appreciated that the control rod may be filled with any of the known vocabulary of neutron absorbing materials. Hafnium rods, for example, can be partially or wholly placed within such tubes T. Combinations of hafnium rods with boron carbide can be used. Likewise, other known neutron absorbers such as europium or dysprosium can as well be used.

Once plug P is placed in the end of rod T to plug cylindrical volume 40 the plug P is typically welded at the interstices between the outer diameter of the plug P and the cylinder 40. Placement of the plug P typically occurs after the individual rods T have been placed in side-by-side relation.

Once the plugs P are welded and in place, the respective ends of the rod T and the plugs P are typically machined, as by milling, to a finished surface 60 shown in broken lines on FIG. 9. Thus it will be appreciated that the respective sides S1–S4 are ready for their respective attachments to the velocity limiter V and the handle H.

Regarding such attachment, it will now be understood that the attachment causes a secondary seal to occur at the respective ends of the individual square sectioned rods T.

Referring to FIG. 4, velocity limiter V at surface V1 abuts the end of the planar control rod surface S1. Welding conventionally occurs at and around the interface between planar surface S1 and velocity limiter surface V1. This weld effects the mechanical attachment of the velocity limiter at plate V1 to the control rod planar surface S1. However, this same weld has a secondary effect. Specifically, the weld forms a secondary or tertiary seal about the plugs P at the lower end of the joined control rods T. Thus the design here shown provides enhanced sealing.

Figure 8:
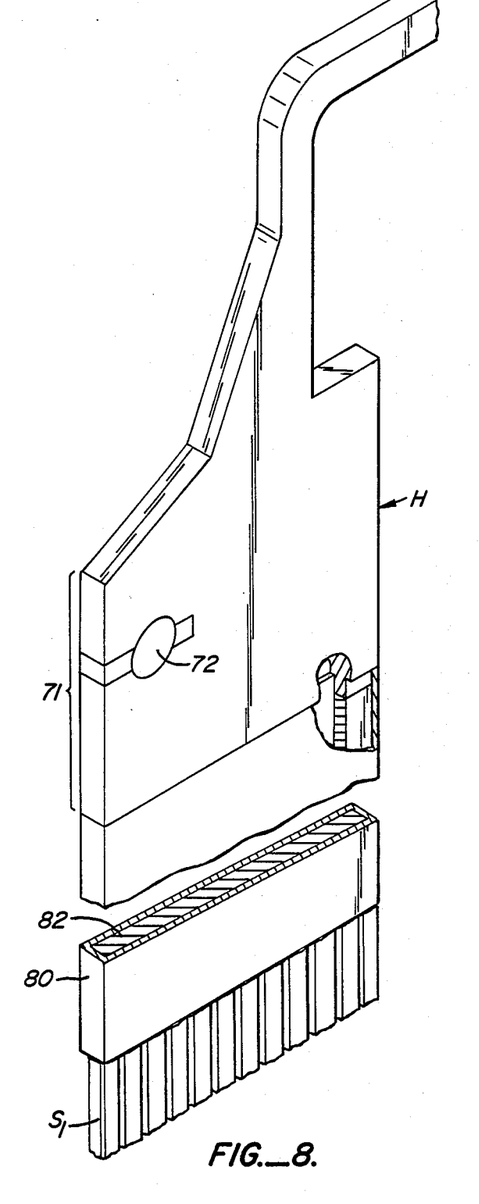

Referring to FIG. 8, construction of the handle H can now be set forth. The upper end of handle H at 71 is conventional and typically comprises a continuous plate of stainless steel having a conventionally mounted control rod guide 72 for rolling over the surfaces of the respective fuel channels 14.

Between the respective ends of the control rod S1 and plate 71 on handle H. a rectangular sectioned tube 80 is placed. This tube defines in the interior a rectangular volume having a complementary rectangular hafnium plate 82.

Plate 82 can be made of any longitudinal length desired. For example, in control cell locations plate 82 is usually relatively long in the range of six inches.

In conventional control rod locations, plate 82 and tube 80 are relatively short in the range of three inches; the plate is given a length only sufficient to withstand the higher neutron fluence at the reactor exposed end of the normally withdrawn control rod.

It will be appreciated that the rectangular sectioned tube 80 is continuously welded around planner control rod surface S1. Likewise, the upper end of the rectangular tube 80 is continuously welded to handle plate 71. These respective continuous welds provide not only containment to the hafnium plate 82 but additionally serve as a secondary seal to the respective ends of the tubes T forming the planar control rod member S.

It has been found that higher volumes of neutron absorbing material can be placed within the disclosed apparatus. Control rods of an increased worth in the range exceeding 10% can be produced.

Further, the disclosed control rods because of their defined central cylindrical volume and the fact that they are tubular extruded provide ideal resistance to known control rod failure phenomenon.

It will be appreciated that the standard tube making techniques can be used for fabricating the disclosed tubes. Consequently, the defined cylindrical volume 40 need not be fabricated by drilling or other factors.

Further, automated welding can include laser welding, electron beam welding, and plazma arc welding. technologies ideally suited for joining the disclosed tube sections.

It will be understood that the increased volume of neutron absorbing material provides improved self shielding. Simply stated, neutron absorbing materials, such as boron carbide, tend to absorb neutrons on their outermost cylindrical areas. Depletion of the neutron absorbing characteristics occurs with successive cylindrical layers absorbing and thereafter being expended in the absorption process. By providing a cylinder of larger diameter, control rod worth is maintained for a longer in service time. Specifically, the surface area present for neutron absorption decreases more slowly with the higher cylindrical volumes of poison or neutron absorbing material.

It will, therefore, be understood that the square tube of this invention contains a unique serendipity which cooperates in the control rod environment. This serendipity includes the composite tubular make up and the ability to construct and fasten the square cross section tubes in side-by-side relation.

What is claimed is:

1. In a nuclear reactor control rod having elongate planar members for absorption of neutrons within a nuclear reactor for control of the nuclear reaction, said elongate planar members being formed of a plurality of tubes arranged side-by-side in abutting contact and joined together, each said tube comprising in combination:
- a tube defining a cylindrical pressure vessel for containment of neutron absorbing poisons, said tube defining constant side wall thickness sufficient to define therewithin a cylindrical volume for the containment of neutron absorbing poisons and having sufficient side wall thickness to retain said poisons under all anticipated pressures from decomposition of said neutron absorbing poisons; and
- said tube integrally defining in addition to said cylindrical pressure vessel four discrete right angle corner sections placed at 90° intervals to the side wall of said constant side wall thickness tube, said four corner sections defining four areas of increased thickness wall with four areas of constant thickness of said tube wall defined therebetween whereby said tube of constant side wall thickness is joined to adjacent tubes by said corner sections to form said elongate flat planar members of said control rod without interference with said cylindrical pressure vessel which completely surrounds said cylindrical volume for the containment of said neutron absorbing poisons; and,
- neutron absorbing poisons confined within said tube for absorption of neutrons for control of said nuclear reaction.

2. The tube of claim 1 and wherein said four corner sections each define planes extending beyond said constant side wall thickness.

3. The tube of claim 1 and wherein said corners are chamfered and rounded.

4. An elongate flat planar member comprising a portion of a nuclear reactor control rod for insertion within the core of a nuclear reactor for control of the reaction, said flat planar member comprising in combination: a plurality of tubes defining cylindrical volumes and having square cross section, each said tube defining a cylinder of constant side wall thickness sufficient for defining therewithin a cylindrical volume for the containment of neutron absorbing poisons; four discrete right angle corner sections integrally formed to said constant side wall thickness cylinder having a placement on the outside of said cylinder at 90° intervals to the side walls of said constant side wall thickness tube, said four corner sections defining four volumes of increased thickness in said tube wall with four areas of constant thickness of said tube wall defined therebetween; neutron absorbing poisons confined within each said tube for absorption of neutrons for control of said nuclear reaction and means for joining said tubes at said corner sections in side-by-side juxtaposed relation to form said elongate flat planar member of said control rod.

5. The flat planar member of claim 4 and wherein the four corner sections of each said juxtaposed tubes together define planes extending beyond said constant side wall thickness.

6. The invention of claim 4 and wherein said corners are chamfered and rounded and define in the interstices said juxtaposed square sectioned tube members a groove for the placement of welding metal and to provide guidance for welding.

7. A control rod for absorbing neutrons within a nuclear reactor core for controlling nuclear reaction within said core, said control rod having four flat planar members extending from an axis, said four flat planar members joined to form a cruciform section normal to said axis to permit movement axially into and out of a complementary crucifier interstitial volume between fuel bundles in said reactor, said planar control rod members each including a plurality of side-by-side square sectioned tube members, each of said square section tube member defining an inner cylindrical volume surrounded by a constant side wall thickness sufficient to define therein within said defined cylindrical volume for the containment of neutron absorbing poison; neutron absorbing poisons confined within said cylindrical volume; each square sectioned tube member including four discrete right angle integral corner sections having integral placement at 90° intervals to the side walls of said tube, said four corner sections defining four volumes of increased thickness in said tube wall with four areas of constant thickness of said tube wall defined therebetween whereby said tubes completely surround said cylindrical volume for the containment of said neutron absorbing poisons, said tubes disposed in side-by-side relation parallel to said control rod axes the length of said control rod at each planar control rod member; and means joining said tubes in said side-by-side relation at adjoined corner sections.

8. A control rod according to claim 7 and wherein four said plates are joined to form a cruciform shaped control rod.

9. A control rod according to claim 7 and wherein said said side-by-side square sectioned members have said cylindrical volumes are plugged at each end to form a first seal and joined to a control rod end to form a secondary seal.

10. A control rod according to claim 9 and wherein said control rod end at said control rod handle includes a rectangular tube, said tube connected to said planar control rod member at one end and to said control rod handle at the other end, said rectangular sectioned tube containing a neutron absorbing material.

11. A control rod according to claim 9 and wherein said rectangular tube contains a plane of hafnium.

12. In a nuclear reactor control rod having elongate planar members for absorption of neutrons within a nuclear reactor for control of the nuclear reaction, said elongate planar members being formed of a plurality of tubes arranged side-by-side in abutting contact and joined together, each said tube comprising in combination:
- a tube defining a cylindrical pressure vessel for containment of neutron absorbing poisons, said tube defining of constant side wall thickness sufficient to define therewithin a cylindrical volume for the containment of neutron absorbing poisons and having sufficient side wall thickness to retain said poisons under all anticipated pressures from decomposition of said neutron absorbing poisons; and
- said tube integrally defining in addition to said cylinder four discrete right angle corner sections placed at 90° intervals to the side wall of said constant side wall thickness tube, said four corner sections defining four areas of increased thickness in said tube wall whereby said tube of constant side wall thickness is joined to adjacent tubes by said corner sections to form said elongate flat planar members of said control rod without interference with said cylindrical pressure vessel which completely surrounds said cylindrical volume for the containment of said neutron absorbing poisons;
- welds on adjacent corners of said side-by-side tubes in abutting contact; and, neutron absorbing poisons confined within said tube for absorption of neutrons for control of said nuclear reaction.

13. The tube of claim 12 and wherein said four corner sections each define planes extending beyond said constant side wall thickness.

14. The tube of claim 12 and wherein said corners are chamfered and rounded.

15. An elongate flat planar member comprising a portion of a nuclear reactor control rod for insertion within the core of a nuclear reactor for control of the reaction, said flat planar member comprising in combination: a plurality of tubes defining cylindrical volumes and having square cross section, each said tube defining a cylinder of constant side wall thickness sufficient for defining therewithin a cylindrical volume for the containment of neutron absorbing poisons; four discrete corner sections integrally formed to said constant side wall thickness cylinder having a placement on the outside of said cylinder at 90° intervals to the side walls of said constant side wall thickness tube, said four corner sections defining volumes of increased thickness in said tube of constant side wall thickness; neutron absorbing poisons confined within each said tube for absorbing neutrons for control of said nuclear reaction, and welds for joining said tubes at said corner sections in side-by-side juxtaposed relation to form said elongate flat planar member of said control rod.

16. The flat planar member of said claim 15 and wherein the four corner sections of each said juxtaposed tubes together define planes extending beyond said constant side wall thickness tube.

17. The invention of claim 15 and wherein said corners are chamfered and rounded and define in the interstices said juxtaposed square sectioned tube members a groove for the placement of welding metal and to provide guidance for automatic welding.

18. A control rod for absorbing neutrons within a nuclear reactor core for controlling nuclear reaction within said core, said control rod having four flat planar members extending from an axis, said four flat planar members joined to form a cruciform section normal to said axis to permit movement axially into and out of a complementary cruciform interstitial volume between fuel bundles in said reactor, said planar control rod members, each including a plurality of side-by-side square sectioned tube members, each of said square section tube members defining an inner cylindrical volume surrounded by a constant side wall thickness sufficient to define therewithin said defined cylindrical volume for the containment of neutron absorbing poison; neutron absorbing poisons confined within said cylindrical volume; each square sectioned tube member including four integral corner sections having integral placement at 90° intervals to the side walls of said tube, said four corner sections defining volumes of increased thickness in said tube in addition to said constant side wall thickness whereby said tubes completely surround said cylindrical volume for the containment of said neutron absorbing poisons, said tubes disposed in side-by-side relation parallel to said control rod axes the length of said control rod at each planar control rod member; and welds joining said tubes in said side-by-side relation at adjoined corner sections.

19. A control rod according to claim 18 and wherein said side-by-side square sectioned members have said cylindrical volumes plugged at each end to form a first seal and joined to a control rod end to form a secondary seal.

20. A control rod according to claim 19 and including a control rod handle adjacent one of said control rod ends, said control rod end at said control rod handle includes a rectangular tube, said tube connected to said planar control rod member at one end and to said control rod handle at the other end, said rectangular sectioned tube containing a neutron absorbing material.

21. A control rod according to claim 20 and wherein said rectangular tube contains a plate of hafnium.

* * * * *